United States Patent [19]

Flint

[11] Patent Number: 5,073,831

[45] Date of Patent: Dec. 17, 1991

[54] COOLED TRANSMISSIVE MIRRORS, BEAM SPLITTERS, WINDOWS, AND REFRACTIVE ELEMENTS FOR HIGH-POWER APPLICATIONS

[75] Inventor: Graham W. Flint, Albuquerque, N. Mex.

[73] Assignee: Martin Marietta Corporation, Bethesda, Md.

[21] Appl. No.: 347,265

[22] Filed: May 3, 1989

[51] Int. Cl.$^5$ .................................................. G02B 5/08
[52] U.S. Cl. ........................................ 359/845; 359/883
[58] Field of Search .............. 350/600, 601, 607, 582, 350/584, 418, 319, 608–611, 311, 312, 1.5; 313/24, 477 R; 358/237

[56] References Cited

U.S. PATENT DOCUMENTS

| | | | |
|---|---|---|---|
| 3,600,063 | 8/1971 | Bowen | 350/418 |
| 3,708,223 | 1/1973 | Sorensen et al. | 350/610 |
| 3,884,558 | 5/1975 | Dunn, III et al. | 350/610 |
| 4,057,332 | 11/1977 | Brubaker et al. | 350/319 |
| 4,221,469 | 9/1980 | Stalcup et al. | 350/610 |
| 4,341,204 | 7/1988 | Bloxsom | 350/418 |
| 4,378,626 | 4/1983 | Eitel | 29/527.2 |
| 4,443,059 | 4/1984 | Wells | 350/610 |
| 4,550,684 | 11/1985 | Mahawili | 118/724 |
| 4,552,439 | 11/1985 | Hoag et al. | 350/610 |
| 4,614,405 | 9/1986 | Brandenberg et al. | 350/418 |
| 4,657,358 | 4/1987 | Anthony et al. | 350/607 |
| 4,657,359 | 4/1987 | Thompson et al. | 350/610 |
| 4,680,447 | 7/1987 | Mahawili | 399/408 |
| 4,740,276 | 4/1988 | Marmo et al. | 204/7 |
| 4,772,110 | 9/1988 | Roszhart | 350/610 |
| 4,844,603 | 7/1989 | Eitel et al. | 350/610 |
| 4,895,436 | 1/1990 | Shen | 350/610 |

Primary Examiner—Bruce Y. Arnold
Assistant Examiner—Thong Nguyen
Attorney, Agent, or Firm—Dorr, Carson, Sloan & Peterson

[57] ABSTRACT

An optical element having a thin, transparent plate containing a plurality of shallow cooling channels, and a transparent substrate immediately behind the plate with a plurality of inlet and exhaust ducts underlying and in fluid communication with coolant being circulated through the cooling channels of the plate. In use, the optical element may be configured as a beam splitter, mirror, or aperture sharing device by applying a coating that is at least partially reflective to the face plate of the element. Alternatively, if used as a window or refractive element, the above cooling structure can be applied to both faces of the element. Optical distortion can be further reduced by using a coolant having a refractive index matching that of the substrate.

26 Claims, 4 Drawing Sheets

COOLED TRANSMISSIVE MIRRORS, BEAM SPLITTERS, WINDOWS, AND REFRACTIVE ELEMENTS FOR HIGH-POWER APPLICATIONS

This invention was made with Government support under Contract No. F29601-84-C-0017 awarded by the Department of the Air Force. The Government has certain rights in this invention.

BACKGROUND OF THE INVENTION

1. Field of the Invention

The present invention relates generally to the field of cooled optical elements. More specifically, the present invention relates to optical elements having a transparent substrate with coolant circulating through a series of cooling channels extending through the substrate across at least one face of the element.

2. Statement of the Problem

When exposed to a high-power beam of radiation, optical elements are subjected to extreme thermal loads causing distortion in the reflective or refractive surfaces. A number of devices and processes have been invented in the past relating to cooling of mirrors, lens, and other optical elements in high power applications, including the following:

| Inventor | Patent No. | Issue Date |
|---|---|---|
| Sorensen, et al. | 3,708,223 | Jan. 2, 1973 |
| Brubaker, et al. | 4,057,332 | Nov. 8, 1977 |
| Stalcup, et al. | 4,221,469 | Sept. 9, 1980 |
| Eitel | 4,378,626 | April 5, 1983 |
| Mahawili | 4,550,684 | Nov. 5, 1985 |
| Thompson, et al. | 4,657,359 | Apr. 14, 1987 |
| Mahawili | 4,680,447 | July 14, 1987 |
| Marmo, et al. | 4,740,276 | Apr. 26, 1988 |

Sorensen, et al., disclose a basic example of a cooled mirror in which a series of passages located behind the reflective surface circulate a coolant to minimize thermal distortion of the mirror.

Stalcup, et al., disclose a thermally stabilized mirror in which circulation of coolant in channels behind the face plate of the mirror is used to induce a thermal stress within the back plate of the device. This is done to balance bending stresses produced within the face plate by thermal growth resulting from heat generated by incident radiation.

Eitel, Thompson, et al., and Marmo, et al, disclose other variations of mirrors with cooling channels located behind the reflective surfaces.

Brubaker, et al, disclose a peripherally cooled lens assembly.

In U.S. Pat. Nos. 4,550,684 and 4,680,447, Mahawili discloses a device for heating semiconductor wafers by electromagnetic radiation. The radiation is directed from a lamp source onto the silicon wafer through a window constructed of two spaced-apart plates. Water is pumped through the space between these plates to control the window temperature.

3. Solution to the Problem

None of these prior art references shows an optical element having performance characteristics comparable to the present invention. These advantageous characteristics are largely due to the structure of the present invention wherein a grid of cooling channels extends through a transmissive substrate. As is discussed at length below, use of a transmissive substrate greatly reduces the thermal load placed on the coolant circulating through the grid of cooling channels.

SUMMARY OF THE INVENTION

This invention provides an optical element having a thin, transparent plate containing a series of shallow cooling channels, and a transparent substrate immediately behind said plate having a series of inlet and exhaust ducts underlying and in fluid communication with said cooling channels. The optical element may be configured as a beam splitter, mirror, or aperture sharing device by applying a coating that is at least partially reflective to the front plate of the device. Alternatively, if used as a window or refractive element, the above cooling structure can be applied to both faces of the device. Optical distortion can be further reduced by using a coolant having a refractive index matching that of the substrate.

A primary object of the present invention is to provide a cooled optical element for high-power applications with power handling and optical characteristics far in excess of those provided by prior art devices.

Another object of the present invention is to provide a cooled optical element in which coolant flow rates are substantially reduced over those of prior art devices to minimize jitter caused by circulation of coolant within the device and to minimize the size and weight of the cooling system.

These and other advantages, features, and objects of the present invention will be more readily understood in view of the following detailed description and the drawings.

BRIEF DESCRIPTION OF THE DRAWINGS

The present invention can be more understood in conjunction with the accompanying drawings, wherein.

DETAILED DESCRIPTION OF THE INVENTION

I. Cooled Transmissive Mirrors and Beam Splitters

Many space and ground/space systems are based upon the simultaneous use of more than one wavelength or wavelength band. For example, in ballistic missile tracking, the handover from boost phase tracking must use a mid-IR band (usually at 2.7-2.9 microns) in conjunction with the 8-12 micron band associated with cold body tracking. A high-energy laser weapon system usually is required to operate on two target tracking bands while transmitting at the laser wavelength. Many ground based laser system concepts call for the simultaneous tracking of a monochromatic beacon while transmitting at some other wavelength. For purely space based applications, the use of a single aperture for multiple functions, is desirable from considerations of size, weight, and boresight accuracy. In ground/space applications, aperture sharing is dictated by the added requirement that the beacon signal used to control adaptive optics must traverse the same volume of atmosphere as does the aberration-corrected beam that is transmitted, i.e. the tracking signal and the transmitted laser beam must share a common aperture.

In addition to the need for multi-wavelength aperture sharing devices, most of the above-mentioned systems also require high-power beam sampling elements for wavefront correction. Such elements differ from aperture sharing devices in that they split off a small portion of a high-power beam, rather than split out radiation at a second wavelength. However, in the context of the present application, aperture sharing devices and beam splitting devices are sufficiently alike that they will, for the most part, be considered synonymous.

The first embodiment of the present invention, shown in FIGS. 1 through 4, is primarily concerned with aperture sharing or beam splitting devices which are reflective to high-power radiation and which transmit only a lesser power radiation. In the aperture sharing configuration, such a device is reflective at the high-power wavelength, but is transparent at some other wavelength, i.e. it behaves as a cooled dichroic mirror. In a beam sampling configuration, the majority of the power is reflected, while a small portion at the same wavelength is transmitted, i.e. it behaves as a cooled semitransparent mirror.

Figure 1:
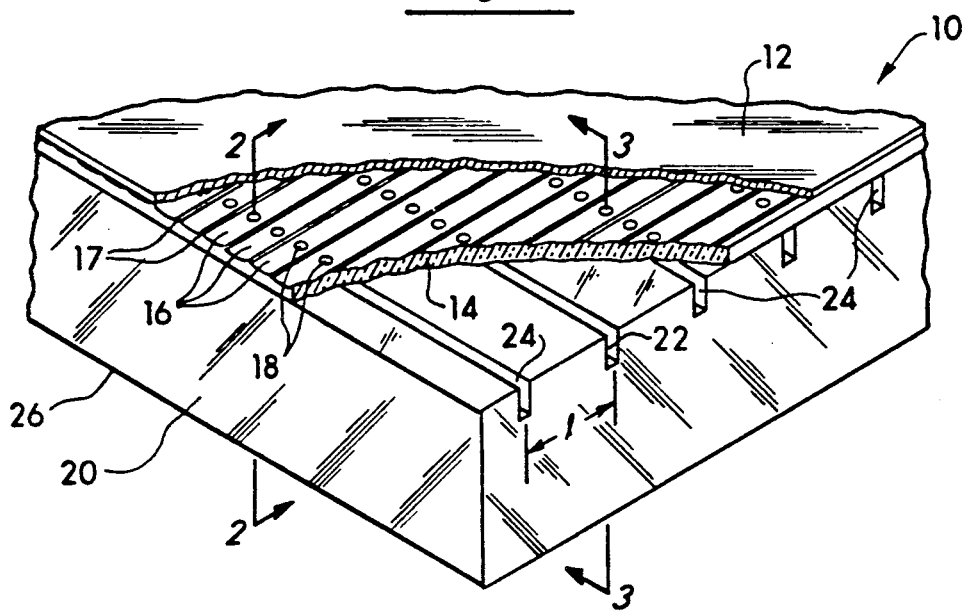
FIG. 1 is a cut-away perspective view of a cooled beam splitter incorporating the present invention.
Figure 2:
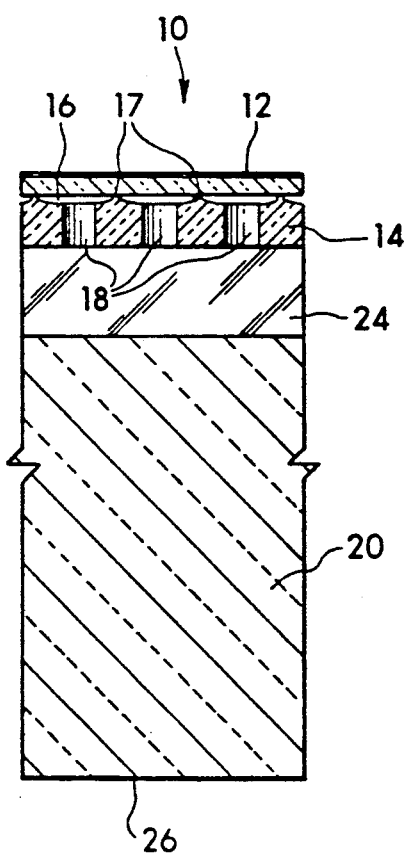
FIG. 2 is a vertical cross-sectional view corresponding to FIG. 1, taken along line 2—2.
Figure 3:
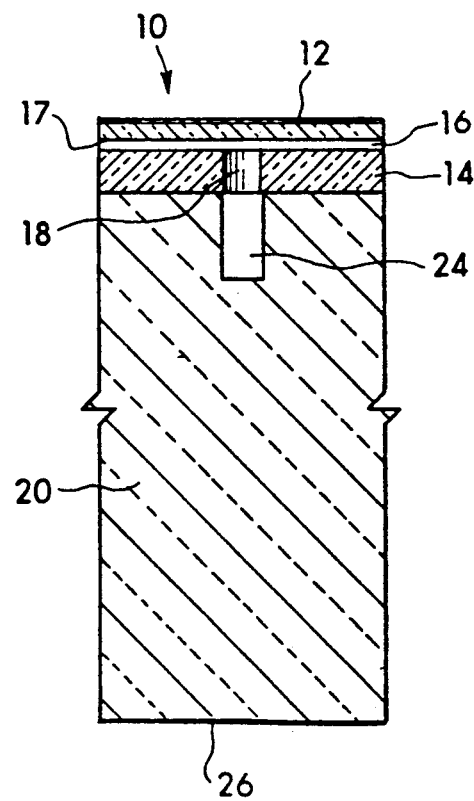
FIG. 3 is another vertical cross-sectional view corresponding to FIG. 1, taken along line 3—3.

In the beam sampling configuration, a cooled beam splitter device 10 is arranged as shown in FIGS. 1 through 4. When configured as a transmissive mirror, the mirror structure is comprised of three principal elements. At the front face is a thin transparent plate 12 upon which is deposited a multilayer dielectric reflective coating. Immediately behind the face plate is a second transparent plate 14 having a series of shallow cooling channels 16 extending across its forward face. Adjacent cooling channels are separated by narrow raised ridges 17. This second plate also incorporates a series of through holes 18 connecting the cooling channels 16 to underlying exhaust ducts 22 and inlet ducts 24. The inlet/exhaust ducts 24 and 22 are generally perpendicular to the cooling channels 16, thereby forming a rectangular grid arrangement. FIGS. 2 and 3 are two vertical cross-sectional views corresponding to FIG. 1 further illustrating the fluid connection between the cooling channels 16 and the underlying inlet/exhaust ducts. The third element of the device is a relatively massive transparent substrate 20 attached to the rear of the second plate 14. The substrate 20 incorporates the inlet and exhaust ducts 24 and 22 and provides the necessary structural support and rigidity for assembly.

The design of a cooled beam splitter or shared aperture device is very similar to that described above. The major structural difference is that the inlet and exhaust ducts 24 and 22 are rearranged to minimize obscuration of transmitted radiation. The other major difference is the use of a coolant having a refractive index closely matching the index of the surrounding structure. This allows transmitted radiation to pass through the structure without being influenced significantly by the presence of the cooling channels 16. Finally, the rear surface of a cooled beam splitter 10 is provided with a conventional antireflection coating 26.

The multilayer dielectric coating on the first surface 12 of the device is designed to be a near perfect reflector at the high-power wavelength. For a conventional ion beam deposited coating, the radiation which is not reflected manifests itself primarily as forward scatter and/or leakage through the coating. The fractional power absorbed by the coating is far less than that lost through leakage and scatter. Since the substrate 20 is substantially transparent, the leakage and forward scatter pass through the substrate with essentially no absorption. Consequently, the cooling requirements are confined to those associated with the minuscule absorption (about 10 to 20 parts per million) occurring within the coating itself. Localized cooling of the multilayer coating is accomplished via a set of shallow cooling channels 16 located immediately behind the front face 12 of the beam splitter 10. The coolant flowing through these channels 16 is selected such that it is optically non-absorbing and such that its refractive index matches that of the substrate 20 at the wavelength of the radiation being sampled. In addition to passing through the substrate 20 and coolant with little absorption, the radiation associated with leakage and scatter exits the beam splitter 10 without having undergone significant wavefront distortion. Thus, to summarize, the present invention can be readily adapted with minor changes for use in at least three distinct functions, as follows:

(1) A high-power transmissive substrate mirror where the coolant refractive index is not necessarily matched to that of the substrate. This class of devices is essentially a replacement or substitute for conventional high-power mirrors;

(2) A high-power transmissive substrate device having a front surface that is at least partially reflective, in which the coolant and substrate refractive indices are matched at the high-power wavelength. This class of devices is used in high-power wavefront analyzers and beam samplers; and (3) A high-power transmissive substrate device having a front surface that is at least partially reflective, in which the coolant and substrate refractive indices are matched at a wavelength other than the high-power wavelength. Included in this class are devices performing multi-wavelength aperture sharing functions.

In a conventional cooled mirror, no distinction is made between the power absorbed in the multilayer coating and that which passes through the coating to the substrate via leakage and scatter. The cooling system behind the face of a conventional mirror must, therefore, accommodate the power from all three sources. On the other hand, a transparent substrate device permits the power associated with leakage and scatter to be absorbed by a means separate from the device itself. For devices employing ion beam deposited coatings, wherein the sum of leakage and scatter greatly exceeds absorption, this distinction imposes a far larger thermal load upon a conventional mirror than upon its transparent counterpart under the present invention. This fundamental difference cannot be stressed too strongly, in that it is largely as a consequence of this difference that the thermal efficiency of transparent substrate devices exceeds that of conventional mirrors by nearly two orders of magnitude.

Figure 5:
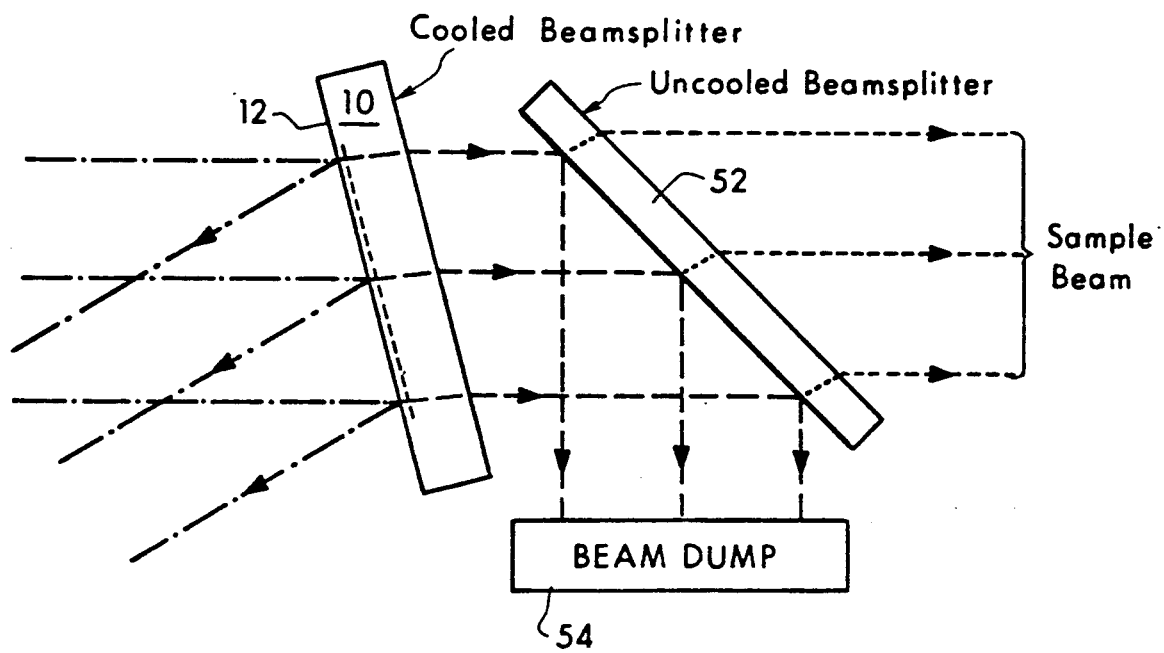
FIG. 5 is schematic view showing one typical application of the cooled beam splitter pictured in FIGS. 1 through 4.

High-power radiation transmitted through a cooled beam splitter represents perhaps 0.1% of the original beam. For beams in the multi-megawatt range, this is still a substantial power density and is far more than is necessary or convenient for beam diagnostic purposes. In these situations, a second beam splitter 52 can be used to further attenuate the beam, as shown in FIG. 5. This allows the majority of the radiation to be deflected into a beam dump 54. Since the power density incident upon the front surface of the second beam splitter 52 is approximately three orders of magnitude less than that of the original beam, the second beam splitter 52 requires no active cooling.

For shared aperture applications where a second wavelength must pass through the device with a minimum of attenuation, both beam splitters 10 and 52 are provided with dichroic coatings on their forward surfaces. For applications where both aperture sharing and beam sampling must be accomplished, the assembly can be provided with a third beam splitter to simultaneously perform both functions.

The following analysis considers two alternative beam splitter designs One employs a structure of fused silica and the other a structure of Zerodur ceramic. The fused silica design employs carbon tetrachloride as its index-matching coolant. The Zerodur version uses a mixture of chlorobenzene and bromobenzene. Both designs are based upon a coolant pressure drop of $2.85 \times 10^6$ dyne cm$^{-2}$ (40 psi) within the face plate. The total drop, including inlet and exhaust ducts, is slightly less than $3.56 \times 10^6$ dyne cm$^{-2}$ (50 psi) The coolant flow rates are approximately 5 cubic centimeters per second per square centimeter of face plate area.

This analysis indicates that the critical factors determining the power handling capability of a cooled beam splitter are the optical absorption coefficients of the substrate and coolant at the wavelength which is reflected. This unexpected result stems from the previously noted finite transmittance and forward scatter of multilayer dielectric coatings.

The following comparison of cooled beam splitter performances at the 1.315 micron wavelength of the oxygen iodine laser is based upon a transmitted wavefront distortion of ⅛ wave in the visible range. Analysis shows that a typical Zerodur structure can withstand an incident power density on the order of 20 to 40 kilowatts per square centimeter, while a similar fused silica beam splitter can withstand a power density in the range of 100 to 600 kilowatts per square centimeter. The large disparity between the performances of the two devices stems from the differences in their absorption coefficients. For reflected wavelengths at which fused silica has significant absorption, the performances become similar and both devices are able to withstand absorbed power densities in the range of 20 watts per square centimeter and incident power densities in the range of 20 to 40 kilowatts per square centimeter.

In comparing the performance of a cooled transparent substrate beam splitter to that of a conventional mirror, it is important to note that the effective absorbed power capability of a beam splitter device includes the power absorbed by its beam dump. For a beam splitter having low-absorption ion beam deposited coating, the power absorbed by the beam dump is about fifty times that absorbed by the beam splitter itself. Thus, the modest 20 watt per square centimeter absorption figure associated with a fused silica beam splitter is equivalent to an absorbed power density of about 1,000 watts per square centimeter in a conventional mirror. Herein lies a key advantage of the beam splitter device. While handling the same absorbed power density as the best of conventional mirrors, it can absorb approximately 98 percent of that power in a beam dump that is isolated both thermally and acoustically from the critical optical components.

Both the fused silica and the Zerodur designs perform better in reflection than in transmission. The surface distortion coefficient for the fused silica version is approximately 8 Angstroms per watt of absorbed power per square centimeter. Thus, at its absorbed power design limit of about 20 watts per square centimeter, the reflected wavefront distortion at 0.6328 micron is about 1/20 of a wave. The Zerodur version has a surface distortion coefficient which is less than that of its fused silica counterpart by more than an order of magnitude. Thus, at its maximum incident power rating, it reflects radiation with negligible distortion.

Comparison of the efficiency of a fused silica beam splitter with the efficiencies of conventional mirrors can be made on the basis of their coefficients of performance. The coefficient of performance is a dimensionless quantity defined by the ratio of power absorbed by the device to the power required on the part of the cooling system. The coefficients of performance for conventional cooled mirrors range from about 40 at 100 watts per square centimeter to about 10 at 1000 watts per square centimeter. In contrast, for the same absorbed power densities, a fused silica beam splitter exhibits coefficients of approximately 4000 and 400, respectively. This dramatically higher efficiency on the part of the beam splitter leads, naturally, to a cooling system of significantly reduced size and weight. However, of perhaps greater importance is the attendant reduction in coolant flow induced jitter. At an absorbed power density of approximately 100 watts per square centimeter, the power dissipated by coolant flow within a conventional mirror is 125 times that dissipated in an equivalent fused silica beam splitter. Furthermore, while essentially 100 percent of the coolant flow power dissipated in a conventional mirror is associated with turbulent flow, the design of the present invention is such that 80 percent or more of the flow power is associated with the intrinsically less noisy state of laminar flow.

A similar comparison between the fused silica beam splitter and Zerodur mirror (both incorporating the present invention) shows that their coefficients of performance are comparable. However, the maximum achievable absorbed power density on the part of the beam splitter is greater than that of the mirror by about an order of magnitude. Also, the rise in surface temperature of the beam splitter, when operating at 1000 watts per square centimeter absorbed, is less than that of the Zerodur mirror when operating at 30 watts per square centimeter.

Based upon the preceding, it appears that the cooled beam splitter constructed in accordance with the present invention represents a technologically significant advance that has long been overlooked. Its optical performance in reflection is on a par with the best conventional mirrors, while at the same time offering the option of aperture sharing and/or beam sampling. With a power handling capability that appears to match anything currently available, its coefficient of performance in the high power regime is vastly superior to that of its competitors. As a consequence, it not only requires a much smaller cooling system but also should exhibit significantly less jitter than a conventional mirror. In light of the above conclusions, the present invention should be considered as a potential replacement for conventional high-power mirrors, even in applications where beam sampling or aperture sharing are not required. As a replacement for conventional high-power mirrors, it is not necessary to provide perfect index matching between the substrate and coolant fluid. Thus, for high-power wavelengths in the visible and near-infrared, it may be possible to take advantage of the higher specific heat of water to further increase the coefficient of performance of the device.

A. Wavefront Distortion in Transmission

From the standpoint of transmitted wavefront distortion, it is necessary to optimize the design of the cooled beam splitter such that the optical inhomogeneities introduced by thermal loading are kept to a minimum. The most critical phenomenon in this regard is the change in refractive index of the cooling fluid with temperature. To optimize system performance in transmission, the depth of the cooling channels, as measured along the path of the transmitted beam, must be small to minimize the effects of temperature gradients in the fluid. On the other hand, if the channels are made too shallow, the fluid flow rate associated with reasonable pressure differentials becomes too small, leading in turn to an excessive rise in the temperature of the fluid. However, depending upon the coolant used, there is an optimum channel depth determined in part by mechanical constraints and in part by the physical properties of the cooling fluid.

As will be shown later, fluid flow in the inlet and exhaust ducts of the device will typically be turbulent, while the flow within the cooling channels will be laminar. However, by virtue of the small cross-section of the cooling channels, the pressure drop in the coolant loop will be dominated by that of the face plate. Thus, to optimize the system, it is appropriate first to examine the flow characteristics of the face plate. For this purpose, consider the flow in a channel structure, such as that shown in FIGS. 1 through 4. The center-to-center spacing of the channels 16 is S, and the width of the channels 16 is $\gamma$S. The length and depth of the channels are $l$ and $d$, respectively. The volumetric flow of a channel of unit width is given by:

$$Q = \frac{\Delta p d^3}{12 \mu l} \qquad (1)$$

where $\Delta p$ is the pressure drop from end to end of the channel, and $\mu$ is the coefficient of viscosity. Since the length of the channels 16 is $l$ and their fractional width is $\gamma$, the volumetric flow per unit area of the face plate 12 becomes:

$$W = \frac{\gamma \Delta p d^3}{12 \mu l^2} \qquad (2)$$

Also, since the cross-section of a channel having unit width is d, the mean velocity of the flow is given by:

$$U = \frac{\Delta p d^2}{12 \mu l} \qquad (3)$$

If the power absorbed per unit area of the face plate is H, then the temperature rise of the coolant becomes:

$$\Delta T = \frac{H}{W \rho C_p} \qquad (4)$$

where $\rho$ is the mean density of the fluid, and $C_p$ is its specific heat. It should be noted, however, that for the power density to be expressed in watts per unit area, the specific heat must be expressed joules per unit mass per degree.

For near normal incidence radiation, the fractional optical path difference introduced by the above temperature rise is given by:

$$\frac{\Delta \lambda}{\lambda} = \frac{d}{\lambda}\left[\frac{dn}{dT}\right]\Delta T = \frac{dH}{\lambda W \rho C_p}\left[\frac{dn}{dT}\right] \qquad (5)$$

where $\lambda$ is the optical wavelength and (dn/dT) is the temperature coefficient of the refractive index for the coolant fluid. It is assumed that both the expansion coefficient and temperature coefficient of the refractive index for the structure are small compared to those of the coolant fluid. By substitution of equation (2) in equation (5), the fractional optical path difference can be expressed as:

$$\frac{\Delta \lambda}{\lambda} = \frac{12 \mu H l^2}{\gamma \rho \lambda C_p \Delta p d^2}\left[\frac{dn}{dT}\right] \qquad (6)$$

To minimize the value of $\Delta \lambda / \lambda$, while remaining consistent with the previously assumed condition of laminar flow, we must introduce a Reynolds number constraint. The Reynolds number associated with flow within the cooling channels is given by:

$$Rn = \frac{\rho U D}{\mu} \qquad (7)$$

where D is the hydraulic diameter of a channel. For non-circular channels, the hydraulic diameter is equivalent to four times the cross-sectional area of a channel divided by its wetted perimeter. Thus, for a channel where the width is much larger than the depth, the hydraulic diameter can be approximated by D=2d. Using this approximation and substituting the value of U from equation (3), equation (7) can be rewritten in the following form:

$$d = \left[\frac{6 l \mu^2 Rn}{\rho \Delta p}\right] \qquad (8)$$

Finally, upon substitution of equation (8) in equation (6), we obtain:

$$\frac{\Delta \lambda}{\lambda} = \frac{3.63 H l^{4/3}(dn/dT)}{\gamma \lambda C_p Rn^{2/3}(\rho \mu \Delta p)^{1/3}} \qquad (9)$$

From examination of equation (9), it becomes apparent that the beam splitter structural design parameters which have primary influence upon the optical distortion of a transmitted beam are the channel length l, and the fraction width $\gamma$ of the channels. For an optimized design, the pressure drop $\Delta p$ is of secondary importance, its upper limit being constrained by strength and stiffness limitations of the thin face plate.

The physical properties of the cooling fluid having the strongest influence upon distortion are the specific heat $C_p$ and the temperature coefficient of refractive index (dn/dT). The inverse cube root dependence upon fluid density $\rho$ has little influence upon distortion by virtue of the narrow range of available densities. Also, the practical considerations embodied in equation (8), taken in conjunction with the structural requirement for channels of small physical width, effectively constrain the fluid viscosity to the lower extreme of the available range.

For maximum cooling efficiency within the laminar flow range, we can set the Reynolds number Rn at 2000. Convenient values for the channel length l and the fractional channel width are 1 centimeter and 0.8, respectively. Similarly, a practical coolant pressure is $2.85 \times 10^6$ dyne cm$^{-2}$ (40 psi). As a convenient point of reference, we assume that the wavelength of the transmitted beam is $6.328 \times 10^{-5}$ m (i.e. at the 0.6328 micron line of HeNe). Equation (9) can then be rewritten to express the transmitted wavefront distortion of the beam splitter in the form:

$$\frac{\Delta \lambda}{\lambda} = \frac{3.19 (dn/dT) H}{C_p (\rho \mu)^{1/3}} \quad (10)$$

Using equation (10), we can examine the performance of a pair of typical beam splitter devices. For this purpose, we assume that the first device is constructed of fused silica and that the second is of Zerodur ceramic. Fused silica is the best example of a low-expansion material having excellent optical homogeneity combined with a broad spectral transmittance. One-tenth wave accuracy in transmission through several centimeters of material can be achieved with relative ease. Optical transmittance for most optical grades of fused silica is excellent throughout the wavelength range of 0.25 to 2.0 microns. For special grades, these wavelength limits can be extended to encompass 0.17 to 3.5 microns. The expansions coefficient near room temperature is approximately $5.5 \times 10^{-7}$ °C.$^{-1}$. For a transmitted beam wavelength of 0.6328 micron, the room temperature refractive index of fused silica is 1.4571.

Zerodur is a glass ceramic having an exceptionally low expansion coefficient in conjunction with a modest optical transmission. The expansion coefficient of premium grade Zerodur is $5 \times 10^{-8}$ °C.$^{-1}$ or less. Its useful optical transmittance for a thickness of several centimeters extends from about 0.6 to 2.5 microns wavelength. In its recently available premium-grade form, the optical homogeneity can be maintained at $5 \times 10^{-6}$. Thus, without hand correction, a transmitted wavefront at 0.6328 micron can traverse a thickness of 3 centimeters with wavefront distortion of about $\frac{1}{4}$ wave. With hand correction of one surface, the residual wavefront distortion can be reduced to 1/10 wave or better. For a transmitted beam at 0.6328 micron, the room temperature refractive index of Zerodur is 1.5398.

Carbon tetrachloride (CCl$_4$) is a fluid that is well suited as a coolant with a near perfect index match to fused silica at 20° C. Its refractive index at a wavelength of 0.6328 micron is 1.4587. The temperature coefficient of the refractive index (dn/dT) for carbon tetrachloride at this wavelength is approximately $-0.00045°$ C.$^{-1}$. Assuming this value for (dn/dT), and neglecting the change in index for fused silica, the temperature for perfect index matching is 25.6° C. It should be noted that both the dispersion and temperature coefficient of the refractive index for carbon tetrachloride are greater than those for fused silica. As a consequence, the temperature and wavelength ranges over which matching occurs are limited. In practice, where it may be desirable to use a different operating temperature or transmitted wavelength, the temperature/wavelength match must be fine tuned by use of miscible additives. For carbon tetrachloride in a fused silica structure, the magnitude of fine tuning necessary to encompass a temperature range of 20° C. and a spectral band of 200 millimicrons amounts to about $\pm 0.01$ in refractive index. An increase in the matching temperature or wavelength within this range can be accomplished by the addition of bromochloromethane (CBrCl$_3$), which has a refractive index higher than that of carbon tetrachloride by approximately 0.046. Conversely, the matching temperature or wavelength can be decreased by the addition of fluorotribromomethane (CFBr$_3$), which has a refractive index lower than that of carbon tetrachloride by approximately 0.044.

For Zerodur, there is not a suitable pure fluid exhibiting a perfect index match in the 20° to 30°C. range. However, chlorobenzene (C$_6$H$_5$Cl) and bromobenzene (C$_6$H$_5$Br) are otherwise well suited fluids having refractive indices at 20° C. of 1.5217 and 1.5562, respectively. These fluids are perfectly miscible and provide the desired index of 1.5398 when mixed in a volumetric ratio of approximately 47.5 parts chlorobenzene and 52.5 parts bromobenzene. The exact mixing ratio depends upon the desired operating temperature and must be established by an experimental determination of index versus temperature and composition.

Returning to equation (10), $\Delta \lambda / \lambda$ can be determined as a function of absorbed power density for the optimized fused silica and Zerodur beam splitters. Substituting values from Table I in equation (10) yields:

$$\left[ \frac{\Delta \lambda}{\lambda} \right]_{\substack{fused \\ silica}} = 6.84 \times 10^{-3} H \quad (11)$$

and $$\left[ \frac{\Delta \lambda}{\lambda} \right]_{Zerodur} = 5.52 \times 10^{-3} H \quad (12)$$

Thus, for a transmitted wavefront distortion of $\frac{1}{8}$ wave, the fused silica beam splitter can accommodate 18.3 watts of absorbed power per square centimeter, and the Zerodur beam splitter can accommodate 22.6 watts per square centimeter.

To determine the optimum cooling channel depth, we must substitute appropriate values of l, $\mu$, $\rho$, and $\Delta p$ in equation (8). Taking Rn = 2000 as before, we find that the optimum channel depths for fused silica and Zerodur beam splitters are 60 microns (0.0024 in.) and 63 microns (0.0025 in.), respectively.

From equation (2), we find that the volumetric flow per square centimeter of face plate area is 4.58 cm$^3$ sec$^{-1}$ for the Zerodur version. Equation (4) tells us that the increases in coolant temperature per watt absorbed per square centimeter for the fused silica and Zerodur versions are 0.160 and 0.124° C. watt cm$^{-2}$, respectively. At their maximum ratings of 18.3 and 22.6 watt cm$^{-2}$, the coolant temperature increases due to the power absorbed by the mirror surfaces are quite similar, name 2.93° C. for fused silica and 2.80° C. for Zerodur.

There is also a temperature rise due to internal frictional heating within the coolant itself. At the differential pressure of the fused silica and Zerodur beam splitters described above, this frictional heating amounts to 1.31 watts and 1.52 watts per square centimeter of face plate, resulting in additional temperature increases of 0.21° C. and 0.19° C., respectively. Thus, the maximum total temperature increases due to frictional heating plus absorption at the mirror surface will be 3.14° C. and 2.99° C., respectively. Since the magnitude of the frictional heating correction is only about 7%, it has been neglected in the previous calculation of wavefront distortion.

B. Wavefront Distortion in Reflection

Reflective distortion of the beam splitter face plate stems from six discrete thermal expansion effects within the face plate and its supporting structure. For convenience, we shall define each of these distortions by its own distortion coefficient. Further, to avoid confusion, we shall identify each coefficient by two subscripts. The first subscript identifies the location of the distortion, and the second identifies the source of the distortion. For example, the distortion coefficient $D_{fg}$ defines the distortion induced in the face plate by the thermal gradient within the face plate. The coefficient $D_{su}$ defines the distortion in the substrate due to viscous heating of the cooling fluid.

The first form of distortion is that arising from the thermal gradient within the face plate itself. The coefficient defining this source of distortion can be written as:

$$D_{fg} = \frac{\Delta t_{fg}}{H} = \frac{1 + \sigma}{1 - \sigma} \cdot \frac{at^2}{2k} \qquad (13)$$

where $\sigma$ is Poissons' ratio for the substrate material, $a$ is its thermal expansion coefficient, and t is the faceplate thickness.

The second source of distortion stems from the temperature drop across the coolant film boundary. This drop also applies only to the face plate and is governed by the film coefficient, h. This coefficient, $D_{ff}$, is defined as follows:

$$D_{ff} = \frac{\Delta t_{ff}}{H} = \frac{1 + \sigma}{1 - \sigma} \cdot \frac{at}{h} \qquad (14)$$

The film coefficient, h, in the case of laminar flow, is calculated as follows $$h = \frac{K}{D}\left[ 3.66 + \frac{0.0668(D/l)RnPr}{1 + 0.04[(D/l)RnPr]^{2/3}} \right] \qquad (15)$$

where K is the thermal conductivity and Pr is the Prandtl number of the coolant fluid. The Prandtl number is defined by:

$$Pr = \frac{\mu C_p}{K} \qquad (16)$$

The hydraulic diameter, D, and the coolant channel length, l, are as previously defined. For the geometric characteristics and coolant properties discussed earlier, the film coefficient for a fused silica beam splitter is 0.781 watt cm$^{-2}$ °C.$^{-1}$, and that for a Zerodur beam splitter is 0.801 watt cm$^{-2}$ °C.$^{-1}$.

The third source of distortion derives from the transverse temperature gradient within the face plate. The source of this gradient is the progressive rise in the temperature of the coolant as it picks up the thermal load from the face plate. Thus, the coolant distortion coefficient associated with the face plate can be expressed as:

$$D_{fc} = \frac{\Delta t_{fc}}{H} = \frac{1 + \sigma}{1 - \sigma} \cdot \frac{at\Delta T}{H} \qquad (17)$$

where $\Delta T$ is the coolant temperature rise, as defined by equation (4). Via substitution of equations (2) and (4) in equation (17), the coefficient can be written as:

$$D_{fc} = \frac{1 + \sigma}{1 - \sigma} \cdot \frac{12at\mu l^2}{\rho C_p \gamma \Delta p d^3} \qquad (18)$$

However, it is more convenient to express $D_{fc}$ in terms of the Reynolds number. Thus, making appropriate substitutions via equations (3) and (7), we arrive at:

$$D_{fc} = \frac{1 + \sigma}{1 - \sigma} \cdot \frac{2lat}{\gamma \mu C_p Rn} \qquad (19)$$

The fourth source of distortion stems from the transverse temperature gradient within the underlying substrate. As such, its coefficient, $D_{sc}$, is similar to the previously defined face plate coefficient. However, in this case, we must replace the finite thickness, t, with the effective depth to which the transverse gradients extend into the substrate. To define the effective depth rigorously would require a finite element analysis of a detailed beam splitter structure. However, for the purpose of this discussion, we can assume that the depth to which the transverse gradients penetrate is on the order of the transverse channel length. Further, if we assume that the magnitude of the transverse gradient decreases linearly with depth, then the effective depth becomes equal to half the channel length, i.e. 1/2. Based upon this assumption, we can approximate the effects of transverse gradients within the substrate by:

$$D_{sc} = \frac{1 + \sigma}{1 - \sigma} \cdot \frac{al^2}{\gamma \mu C_p Rn} \qquad (20)$$

The final two sources of distortion are not related to the thermal load upon the face plate, but stem from the frictional heating of the coolant fluid as it flows behind the face plate. It has been shown previously that the temperature rise associated with this process is small compared to the rise associated with a maximum thermal load. Nevertheless, it can become the dominant source of thermal distortion when the incident flux induced thermal load is reduced.

The distortion coefficients associated with viscous dissipation within the coolant are denoted as $D_{fg}$ and $D_{sv}$, where the former applies to the face plate and the latter applies to the substrate. Since the pressure drop associated with laminar flow in the cooling channels is linear, the friction induced temperature rise is also linear. This last assumption is made on the basis of a small absolute temperature rise, where the viscosity and specific heat of the coolant can be considered as constant. Assuming linearity, the distortion coefficients associated with viscous heating are similar in form to those associated with the transverse gradients induced by the thermal load. The magnitude of the viscous heating is given by:

$$\Delta T_v = \frac{10^{-7}\Delta p}{\rho C_p} \quad (21)$$

where $\Delta p$ is in dyne cm$^{-2}$ and $C_p$ is in joule gm$^{-1}$ °C$^{-1}$. Thus, we can write the last two distortion coefficients in the form:

$$D_{fv} = \frac{1+\sigma}{1-\sigma} \cdot \frac{10^{-7}\alpha t \Delta p}{\rho C_p H} \quad (22)$$

and $$D_{sv} = \frac{1+\sigma}{1-\sigma} \cdot \frac{10^{-7}\alpha l \Delta p}{2\rho C_p H} \quad (23)$$

It should be noted that the thermal load, H, has been included in the denominators of equations (22) and (23). This allows each of the six coefficients to be defined in terms of distortion per unit flux of absorbed power, while making friction related coefficients independent of the flux.

The total face plate distortion coefficient is given by the sum:

$$D_{TOT} = D_{fg} + D_{ff} + D_{fc} + D_{sc} + D_{fv} + D_{sv} \quad (24)$$

For the fused silica and Zerodur beam splitters described, the parameters pertinent to the various sources of thermal distortion are those summarized in Table II. The only geometric factor appearing in Table II that has not been previously discussed is the face plate thickness, t. The value shown, namely 125 microns, is somewhat arbitrary and corresponds to the thickness used successfully in recent diffusion bonded Zerodur structures. The numerical values of the six distortion coefficients are listed for each beam splitter type in Table III. Consistent with general practice, the values in Table III are given in Angstroms per watt absorbed per square centimeter.

From an examination of Table III, it is apparent that for absorbed power densities of more than a few watts per square centimeter, the distortion is dominated by two factors, these being the thermal impedance at the coolant boundary and the transverse temperature gradients in the substrate. In the case of either beam splitter, for example, the face plate thickness could be increased to 300 microns without greatly affecting the portion of the distortion coefficient which is dependent upon incident power.

In the earlier discussion of beam splitter performance in transmission, the absorbed power densities required to produce a transmitted wavefront distortion of ¼ wave at a wavelength of 0.6328 micron was calculated. These power densities were 18.3 watt cm$^{-2}$ for the fused silica version and 22.6 watt cm$^{-2}$ for the Zerodur version. If these power densities are assumed here, the sum of surface distortions from all sources are 155 Angstroms and 16.2 Angstroms, respectively. Thus, for transmitted wavefront distortions of ¼ wave, the reflected wavefront distortions are approximately 1/20 of a wave for the fused silica beam splitter, and 1/200 of a wave for the Zerodur beam splitter. From these figures, it is concluded that the absorbed power capability of a cooled beam splitter is determined primarily by its performance in transmission. Further, since the performances in transmission of fused silica and Zerodur devices are not greatly dissimilar, the selection of the better material may be influenced more by the superior optical properties of fused silica, than by the superior thermal properties of Zerodur.

C. Cooling System Optimization

In the preceding discussion of typical performance characteristics, both the coolant flow per unit area of the face plate and the pressure drop across the face plate were established. Referring now to the auxiliary ducts 24 and 22 which feed and exhaust this flow, such ducts must be of larger dimensions than those of the shallow channels 16 used to cool the face plate 12. These larger dimensions preclude the use of index matching to render them invisible to the transmitted radiation. It thus becomes necessary to use ducts having a narrow cross-section to the transmitted beam, thereby minimizing their fractional obscuration.

Figure 4:
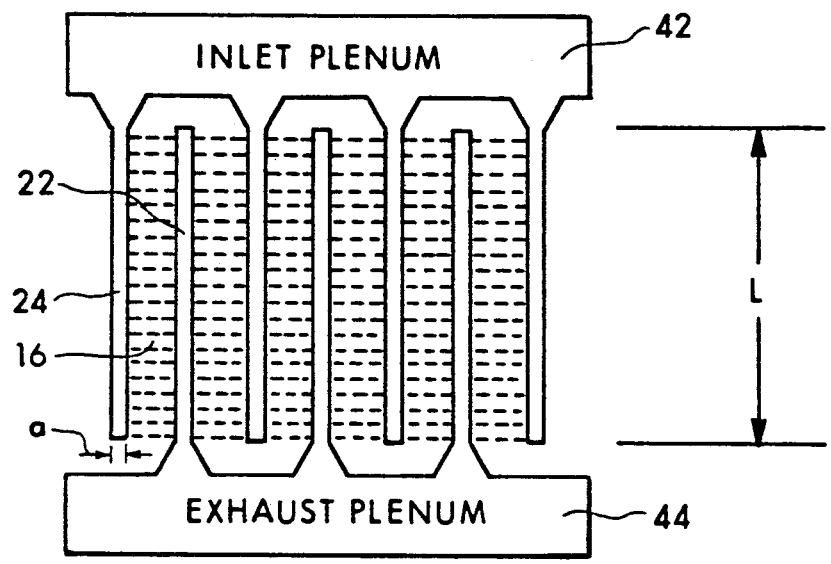
FIG. 4 is a schematic horizontal cross-sectional view corresponding to FIG. 1, showing the pattern of coolant flow through and between the inlet and exhaust ducts.

Assuming an inlet and exhaust duct geometry of the type illustrated in FIG. 4, we can establish the pressure drop in the ducts 24 and 22 in terms of the duct dimensions and the volumetric flow of coolant. As a first step, we must first obtain an order of magnitude figure for the Reynolds number, so as to establish whether the flow in the ducts will be laminar or turbulent. We have previously determined that the coolant flow per square centimeter of face plate area is on the order of 5 cubic centimeters per second. Thus, for a beam splitter structure with a center-to-center spacing between the inlet and exhaust ducts 24 and 22 of one centimeter (i.e. inlet ducts separated by a center-to-center distance of 2 cm), the flow within a single duct will be approximately 10 cubic centimeters per second for every centimeter of beam splitter width. For a width of 10 centimeters, for instance, the flow at the entry to an inlet duct 24 will be about 100 cubic centimeters per second. Since we wish to minimize the size of the ducts, their cross-section can be expected to be on the order of 0.1 square centimeters. This leads to a mean flow velocity, U, of about 1000 centimeters per second. For a duct of this cross-section, the hydraulic diameter, D, will be on the order of 0.3 centimeters. Using the formula for Reynolds number in conjunction with the density and viscosity of cooling fluids previously assumed, leads to a Reynolds number in the vicinity of 50,000. Thus, it can be assumed that the flow within the inlet and exhaust ducts 24 and 2 will always be turbulent.

Under conditions of turbulent flow, the pressure drop associated with flow through a duct having a hydraulic diameter of D is given by:

$$\Delta p = \frac{2C_f l \rho U^2}{D} \quad (25)$$

where $C_f$ is the skin friction coefficient and U is the mean flow velocity. For flow where the Reynolds number is greater than 2000, but less than 100,000, the skin friction coefficient is given by:

$$C_f = 0.079 Rn^{-1/4} \quad (26)$$
$$= 0.079 \left[ \frac{\mu}{\rho UD} \right]^{1/4}$$

Combining equations (25) and (26) yields:

$$\Delta p = - \frac{0.158 \mu^{1/4} \rho^{3/4} U^{7/4} \Delta l}{D^{5/4}} \quad (27)$$

The most convenient geometry for inlet and exhaust ducts 24 and 22 takes the form of a pair of interleaved combs, as shown in FIG. 4. The cooling channels 16 are represented by transverse dashed lines. This arrangement also is desirable from the standpoint of hydraulic symmetry. The length of each inlet and exhaust duct 24 and 22 traversed by the coolant fluid is independent of the location of the cooling channel 16 through which the fluid passes. For such a geometry, the total pressure drop between the inlet plenum 42 and the exhaust plenum 44 closely approximates the sum of the pressure drop in a cooling channel 16 plus the pressure drop from end to end of either an inlet duct 24 or an exhaust duct 22. Thus, we can approximate closely the pressure drop associated with the inlet and exhaust ducting by calculating the differential pressure from end to end of an inlet duct. If the overall length of an inlet duct (i.e. the width of the cooled beam splitter) is L, then the flow within the duct is a maximum at $l=0$, decreasing linearly to zero at $l=L$. The flow velocity at any point, l, is given by:

$$U = \frac{2Wl}{ab} \quad (28)$$

where W is the volumetric flow per unit are of the face plate, a is the width of the inlet duct and b is the depth of the duct. The hydraulic diameter is given by $D=2ab/(a+b)$. Upon substituting for U and D in equation (27) and integrating over the duct length, L, we obtain the total pressure drop in the duct as:

$$P = - \frac{0.223 \mu^{1/4} \rho^{3/4} W^{7/4} (a+b)^{5/4}}{a^3 b^3} \int_0^L l^{7/4} dl \quad (29)$$
$$= - \frac{0.0812 \mu^{1/4} \rho^{3/4} W^{7/4} (a+b)^{5/4} L^{11/4}}{a^3 b^3}$$

If we take the previously derived values for W, together with values for $\mu$ and $\rho$ from Table II, we arrive at expressions which give the pressure drops associated with the inlet and exhaust ducts of fused silica and Zerodur beam splitters, as follows:

$$P_{fused\ silica} = \frac{1.39 L^{11/4} (a+b)^{5/4}}{a^3 b^3} \quad (30)$$

$$P_{Zerodur} = \frac{1.57 L^{11/4} (a+b)^{5/4}}{a^3 b^3} \quad (31)$$

where the pressure drops are in dynes per square centimeter, and a, b, and L are expressed in centimeters.

For a typical beam splitter, we assume that the width, L, of the cooled area is 10 centimeters. Also, as in the previous discussion, assume that the length of the coolant channels is 1 centimeter. If we now make the width, a, of the cooling ducts equal to 0.15 centimeters, then the fractional obscuration due to the ducts will be about 13 percent. Incorporating these assumptions into equations (30) and (31), we find that a duct depth, b, of 0.4 centimeters is sufficient to keep the pressure drop below 10 psi. Specifically, for this depth, the inlet/exhaust duct pressure drop for the fused silica beam splitter is $6.25 \times 10^5$ dyne cm$^{-2}$ (8.78 psi), and that for the Zerodur beam splitter is $7.05 \times 10^5$ dyne cm$^{-2}$ (9.89 psi). Thus, the total pressure drop from the inlet plenum 42 to exhaust plenum 44 is $3.48 \times 10^6$ dyne cm$^{-2}$ (48.8 psi) for the fused silica version and $3.56 \times 10^6$ dyne cm$^{-2}$ (49.9 psi) for the Zerodur version.

D. Maximum Power Densities for Fused Silica Devices

The incident power density that can be handled by a cooled beam splitter is greatly dependent upon the wavelength of the high-power radiation which must be reflected. This is due partly to the variation in performance of coatings as a function of wavelength. However, the overriding factor is the absorption coefficient of the substrate at the reflected, or high-power wavelength. At a wavelength for which the substrate is strongly absorbing, the thermal load constitutes the sum of the power absorbed within the coating, the power transmitted through the coating, and a portion of the power scattered within the coating. On the other hand, at wavelengths for which the substrate is non-absorbing, the thermal load essentially is confined to the power absorbed within the coating. This is a very important distinction in the context of cooled beam splitters.

To illustrate the distinction between absorbing and non-absorbing substrates, let us examine the performance of a fused silica beam splitter in an absorbing regime and in a non-absorbing regime. Rather than considering two widely separated wavelengths, where the dielectric coatings also would be different, it is more instructive to make a comparison at a single wavelength; the wavelength being one for which fused silica is non-absorbing. For the absorbing counterpart, we will assume a hypothetical substrate material having properties which, in all respects other than absorption, are identical to those of fused silica. However, the absorption coefficient of the hypothetical material is assumed to be sufficiently high that all radiation is absorbed within a thin layer at the surface of the face plate. In this respect, the hypothetical mirror behaves much like a conventional mirror having a metal substrate. In fact, the condition could be approximated quite closely in a real beam splitter by introducing a metal layer of low reflectivity beneath the multilayer dielectric coating.

As a practical example, let us consider a near normal incidence high reflector for use at a wavelength of 1.315 microns (the emission wavelength of the oxygen/iodine laser). Coatings developed for this application comprise a 25 layer stack of zirconia ($ZrO_2$) and silica ($SiO_2$). The theoretical reflectivity and transmission of the coating at 1.315 microns are 0.9995 and 0.0005, respectively. In practice, the theoretical reflectivity is not achieved. A typical measured value is approximately 0.9990. However, the absorption, as measured by calorimetry, is only 0.00002. The discrepancy of about 0.0005 in reflectivity is accounted for primarily by scatter within the coating. Further, contrary to simple models which predict that most of the scatter should be in the form of backscatter, the majority of this scatter is found to occur in the forward direction. As a consequence, the sum of expected transmittance plus forward scatter amounts to about 0.001.

The above figures serve dramatically to illustrate the difference between an absorbing and a non-absorbing substrate. For a coating of the above type upon an absorbing substrate, the incident power density that can be accommodated is 1,000 times that which can be absorbed by the cooling system. Using the previously derived figure of about 20 watts per square centimeter of power absorbed in the cooling system, we arrive at a maximum incident power density in the neighborhood of 20 kilowatts per square centimeter. In contrast, if we apply the same coating to our non-absorbing substrate, the maximum power density increases to 50,000 times that which can be absorbed by the cooling system. Thus, for the same absorbed power density, we arrive at a maximum incident power density in the vicinity of 1,000 kilowatts per square centimeter.

The above power density is so high that it raises a degree of skepticism and deserves further comment. First, for instance, one should examine the effects of finite absorption within the substrate and coolant. If it is assumed that the substrate actually is made of an infrared-grade of fused silica (Infrasil), then the absorption coefficient at 1.315 microns wavelength certainly will be less than 0.0005 cm$^{-1}$, and may well approach 0.00005 cm$^{-1}$. The radiation power transmitted through the substrate, assuming a figure of 0.001 for the sum of transmittance plus forward scatter, is about 1,000 watts per square centimeter. If the substrate exhibits the upper limit of absorption coefficient, the power density absorbed within the substrate becomes about 0.5 watts per cubic centimeter. This power density is of sufficient magnitude that some means would have to be provided for its removal. On the other hand, if the lower absorption coefficient is correct, the effects of bulk absorption probably can be neglected.

Bulk absorption within the coolant can be addressed in two parts, namely, that associated with coolant within the cooling channels and that associated with the inlet/exhaust ducts. For our fused silica beam splitter, the depth of the cooling channels is 0.006 centimeters. As noted, the maximum power density absorbed by the coolant is about 20 watts per square centimeter. If we consider that a 10% increase in this thermal load would represent an acceptable perturbation, then the allowable load due to direct absorption of radiation becomes 2 watts per square centimeter. Remembering that the incident flux is about 1,000 watts per square centimeter, the maximum permissible absorption coefficient for the coolant becomes 0.33 cm$^{-1}$. Recent measurements of the spectral absorption of commercial grade carbon tetrachloride have established that the absorption coefficient at 1.315 microns has an upper limit of 0.01 cm$^{-1}$. Also, an initial examination of the absorption spectra of chlorinated and brominated methanes indicates that such additives exhibit no significant absorption bands at wavelengths between 300 millimicrons and 4.5 microns.

The depth of the inlet/exhaust ducts in the fused silica design is 0.4 centimeters. Their fractional projected cross-section is 0.13, giving them a mean depth of 0.052 centimeters. If we allow the total temperature rise in the coolant to be increased by 10% as a consequence of bulk absorption, then the equivalent absorption within the ducts becomes 2 watts per square centimeter. The maximum permissible coolant absorption coefficient consistent with this assumption is 0.038 cm$^{-1}$. Again, this condition should be satisfied without difficulty. As a general comment concerning bulk absorption within the substrate and/or coolant, it would seem that such absorption should not represent an operational limit, provided the absorption coefficient of the fused silica at the high-power wavelength is less than about 0.0001 cm$^{-1}$, and the absorption coefficient of the coolant is less than about 0.04 cm$^{-1}$.

A second argument which can be brought to bear against the realism of the 1,000 kilowatts per square centimeter figure stems from whether the multilayer coating itself can withstand such a power density. To address this issue, one must examine the thermal time constant of the mirror surface and extrapolate the allowable power density from data conducted at shorter exposure times. Such an extrapolation assumes that the permissible power density is constant for exposure times greater than the thermal time constant. The degree of accuracy associated with the extrapolation method is open to debate. However, it should be good enough to provide a rough gauge concerning the reasonableness of our projected power density figure.

It has been shown earlier that the thermal gradients in a beam splitter structure are dominated by the temperature drop at the coolant boundary. Thus the thermal time constant of the face plate can be approximated by $\tau = C_p t/h$, where $C_p$ is the specific heat of the face plate, $\rho$ is the density of the face plate, t is the face plate thickness, and h is the film coefficient. For our fused silica beam splitter, the appropriate values are:

$C_p = 0.75$ joule gm$^{-1}$ °C.$^{-1}$
$\rho = 2.203$ gm cm$^{-3}$
$t = 0.0125$ cm
$h = 0.781$ The corresponding time constant is 0.026 seconds. However, recognizing that our approximation has ignored the thermal impedance of the face plate, it probably is appropriate to round this figure up to 0.03 seconds. Damage threshold measurements conducted at 1.06 microns with 10 nanosecond pulses have shown that good multilayer dielectric coatings can withstand energy densities in the vicinity of 10 joules per square centimeter. The "rule of thumb" scaling factor for allowable energy density as a function of pulse duration goes as the square root of the pulse duration. Thus, the scaling factor between the measured regime and our time constant of 0.03 seconds becomes 1730. For a pulse duration equal to the thermal time constant of the face plate, this scaling factor yields an allowable power density of 577 kilowatts per square centimeter.

The above estimate would seem to indicate that the earlier figure of 1,000 kilowatts per square centimeter is somewhat optimistic, perhaps by a factor of two. However, based upon the performance of ion beam deposited coatings, there is confidence that the allowable power density will be significantly in excess of 100 kilowatts per square centimeter. Thus, in the absence of hard data, it would seem reasonable to expect that the power handling capability at 1.315 microns of a cooled fused silica beam splitter constructed in accordance with the present invention will lie somewhere toward the upper end of the range extending from 100 to 600 kilowatts per square centimeter.

E. Maximum Power Densities for Zerodur Devices

If a similar analysis for a Zerodur structure operating at 1.135 microns wavelength is performed, one arrives at a very different result. The driving factor leading to the disparity lies in the much greater absorption coefficient of Zerodur. At a wavelength of 1.315 microns, the absorption coefficient for Zerodur is approximately 0.04 cm$^{-1}$. If, by virtue of the lower thermal expansion coefficient of Zerodur, we allow a bulk absorption of ten times that allowed in the fused silica substrate (i.e. 1.0 watts cm$^{-3}$) the maximum permissible radiation flux within the substrate becomes 25 watts per square centimeter. Setting the optical transmittance plus forward scatter of the coating at 0.001, as before, one arrives at a limiting incident power density of 25 kilowatts per square centimeter. Thus in the case of the Zerodur beam splitter, the incident power density permissible from the standpoint of absorption within the substrate is essentially identical to the 22.6 watt cm$^{-2}$ figure resulting if all absorption takes place in the dielectric coating. It might, therefore, be desirable to introduce a spectrally selective absorbing film behind the coating, thereby eliminating bulk absorption.

As a note, it is of interest that the transmittance of a multilayer coating can be reduced to a value below that of the 25-layer stack presently assumed Specifically, by increasing the stack to 33 layers, the transmittance is lowered from 0.0005 to 0.00005. Unfortunately, there is no evidence to indicate this also reduces the forward scattered flux. Nevertheless, since the sum of the transmittance, forward scatter, and absorption in the coating would be reduced to about 0.00057, the incident power handling capability of a Zerodur beam splitter would be increased to about 41 kilowatts per square centimeter. The increase in coating thickness would be made at the expense of greater compressive stress. However, for a Zerodur beam splitter, where the incident power handling capacity is well below that for which coating damage becomes of concern, the thicker coating seems well justified. A thicker coating also would be appropriate for a fused silica device which must operate at a wavelength for which fused silica exhibits significant absorption. As a final comment on performance in transmission, it should be stressed that the great disparity between a fused silica device and a Zerodur device exists only for reflected wavelengths wherein fused silica has a low absorption coefficient. If, for instance, one had selected 10.6 microns as the high-power wavelength, the fused silica device, handling 18.3 kilowatts per square centimeter, would be slightly inferior to the Zerodur equivalent.

F. Comparison with Other Mirror Types

Figure 6:
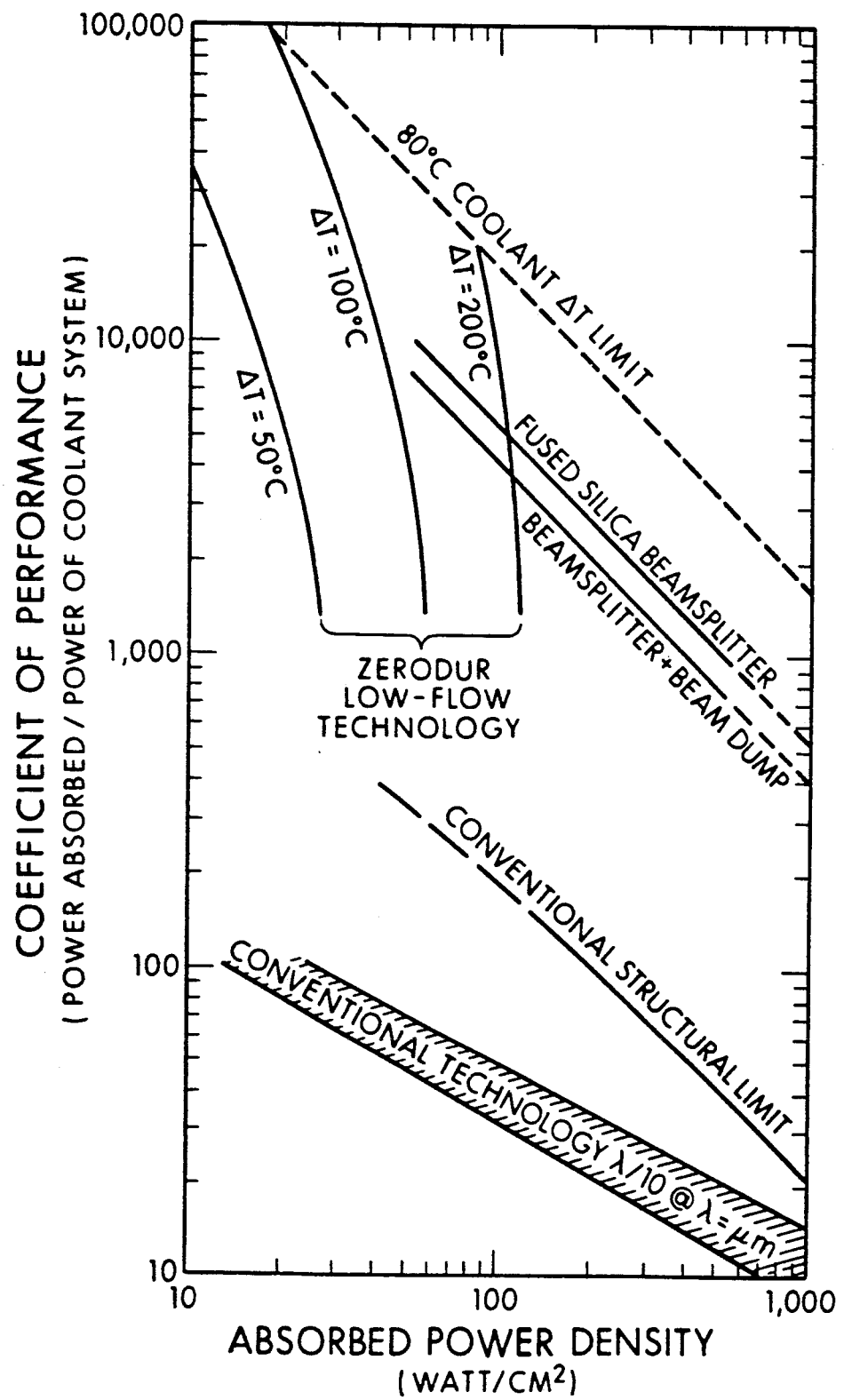
FIG. 6 is a graph showing the coefficient of performance for various cooled mirror structures as a function of the absorbed power density.

Placing the fused silica beam splitter in context with respect to other types of high-power mirrors is most readily accomplished by examining their coefficients of performance as a function of absorbed power density, as shown in FIG. 6. The coefficient of performance is expressed as the power in watts absorbed by the device per watt expended in pumping coolant through the device. For a beam splitter, the power absorbed includes that absorbed both in the beam splitter itself and in the beam dump. The cooling system power constitutes the product of the volumetric flow and the pressure drop across the device. FIG. 6 incorporates absorbed power densities from 10 to 1,000 watts per square centimeter and coefficients of performance from 10 to 100,000.

As can be seen from FIG. 6, mirrors based upon conventional high-pressure turbulent flow fall at the lower end of the coefficient of performance range. A typical conventional molybdenum mirror, for example, can provide 1/10 wavelength performance at 1 micron wavelength when absorbing about 100 watts per square centimeter. Under these conditions, it exhibits a coefficient of performance in the vicinity of 40. Increasing the coefficient of performance within the context of high-pressure turbulent flow is constrained ultimately by the structural limitations of face plate and substrate materials. As shown in FIG. 6, this limit occurs at coefficients of performance of about 20 to 200 for absorbed power densities of 1000 and 100 watts per square centimeter, respectively. The present invention employs laminar coolant flow in a low expansion structure. The resultant coefficients of performance for a Zerodur device (designated "Zerodur Low-Flow Technology" in FIG. 6) are in the 1,000 to 10,000 range, and are far higher than those of conventional mirrors. However, the maximum absorbed power densities are constrained to about 60 watts per square centimeter for a face plate temperature rise of 100° C. or less. For space applications, where face plate temperatures of 200° C. are permissible, the power density can be increased to about 100 watts per square centimeter. These figures correspond to a face plate thickness of approximately 125 microns, i.e. for the same thickness as that assumed for our fused silica beam splitter.

The 80° C. coolant $\Delta T$ limit, shown in the upper portion of FIG. 6, corresponds to the non-optical cooled heat sink in which water is allowed to reach its boiling point and in which local heating is sufficient to cause non-elastic deformation of the heated surface. As such, it is representative of the performance achieved by the beam dump as an integral part of the cooled beam splitter.

As can be seen from FIG. 6, the performance of the fused silica beam splitter combines the power handling capability of the best conventional mirrors with the coefficient of performance typical of a low-flow incorporating the present invention. Its superior coefficient of performance with respect to conventional mirrors is exceptional. The coefficients for absorbed power densities of 100 and 1000 watts per square centimeter are in excess of 5000 and 500, respectively. Even when the additional power required to cool the beam dump is taken into account (lower curve in FIG. 6), the performance coefficient still exceeds 4,000 at 100 watts per square centimeter and 400 at 1,000 watts per square centimeter. In addition to its superior power handling capability, the fused silica beam splitter has a much lower surface temperature rise than does its Zerodur counterpart. The rise is only 46° C. for an absorbed power density of 1,000 watts per square centimeter.

The high coefficient of performance of the fused silica beam splitter obviously has advantages from the standpoint of reduced size and weight of the cooling system. However, of greater importance, is the minimization of jitter as a result of the reduction in power expended by the coolant within the substrate. The magnitude of this reduction can be seen in Table IV comparing two systems wherein the total beam power is 10 megawatts. For a beam cross-section of 100 square centimeters, the incident power density in each case is 100 kilowatts per square centimeter, and the total absorbed power is 10 kilowatts. From FIG. 6, one can obtain the cooling system power dissipation for a conventional mirror and for a fused silica beam splitter. The power dissipation for the latter is divided into that associated with the beam splitter and that associated with the beam dump. As can be seen from Table IV, the power dissipated in the conventional mirror is 125 times the power dissipated in the beam splitter. Further, if one makes the more meaningful comparison of power dissipated in turbulent flow, the ratio is in excess of 600. Since the jitter induced in a mirror is directly related to the acoustic input via turbulent flow, it can be predicted that the beam splitter device will exhibit a jitter several orders of magnitude less than that of its conventional counterparts.

II. Cooled Windows and Refractive Elements

The preceding discussion dealt primarily with transmissive mirrors, beam splitters, and aperture sharing devices, all of which reflect most of the radiation incident upon their front surfaces. As a consequence, the fraction of incident power that is transmitted through the substrate of such devices is relatively small, typically less than a kilowatt per square centimeter. Thus, although the devices described previously are capable of transmitting radiation in a coherent fashion, they essentially are reflectors.

Figure 7:
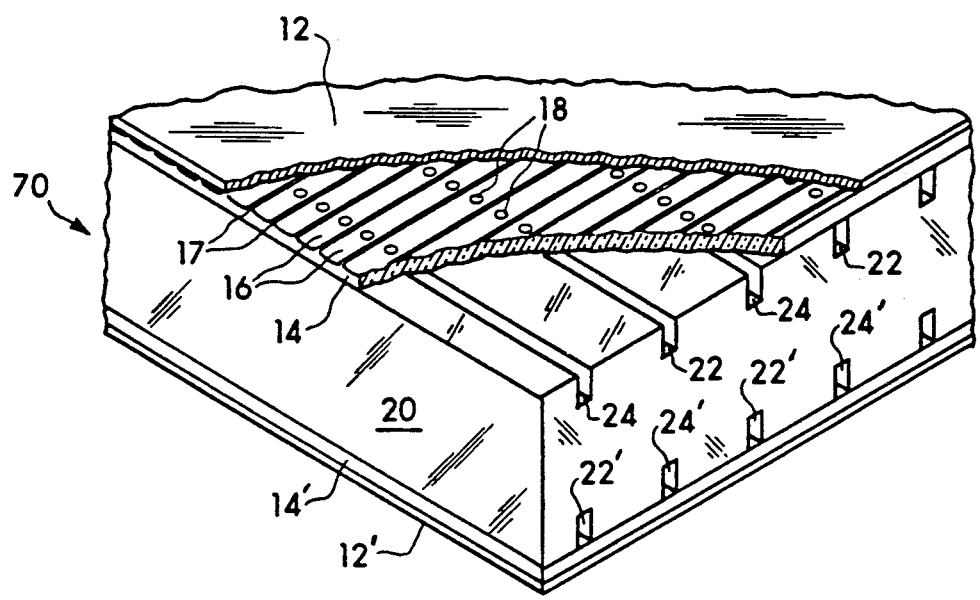
FIG. 7 is a cut-away perspective view of a cooled window having cooling structures on both surfaces of the window.

The simplest cooled refractive element is a window of the type shown schematically in FIG. 7. The cooling geometry described previously in the context of cooled mirrors and aperture sharing devices has been applied to both the front face 12 and rear face 12' of the element. Both faces 12 and 12' are also provided with a multilayer dielectric anti-reflection coating. A third transparent plate 14' is located between the bottom surface of the substrate 20 and the rear face plate 12'. This third plate 14' is identical to the second plate 14 and contains cooling channels extending across its lower face. A series of inlet and exhaust ducts 24' and 22' extending across the bottom face of the substrate 20 are in fluid communication with the cooling channels on the third plate 14'. The flow of coolant from the inlet ducts 24' through the cooling channels and out the exhaust ducts 22' is identical to that previously described for the cooling structure beneath the face plate 12 of the device.

The absorptions of thin uncooled samples of fused silica with applied anti-reflection coatings on both surfaces have been measured calorimetrically at a wavelength of 1.315 microns. These measurements indicate that the absorption associated with a single anti-reflection coated surface is not greater than 20 parts per million, i.e. the absorption will be similar to that assumed previously for ion beam deposited multi-layer dielectrics on reflective devices.

Since it has been established on theoretical grounds that a cooled surface having 20 part per million absorption can handle incident fluxes up to the 1,000 kilowatt per square centimeter range, the examination of refractive elements needs only to determine the maximum fluxes consistent with maintaining the requisite degree of internal optical homogeneity. Specifically, we will establish the wavefront aberrations of a transmitted beam as a function of both bulk absorption coefficient and device thickness when the intensity distribution of the transmitted flux is non-uniform. The effects contributing to such aberrations are axial growth of the substrate and the change in refractive index of the substrate due to bulk heating.

If we assume that the absorptions of the coated faces are alike, then the temperature distribution within the device is symmetrical about its mid-plane. Thus, for a cooled window of total thickness A, the heat flux in watts per unit area being conducted through the plane located at a distance x from a cooled face ($A/2 \geq x \geq 0$) becomes:

$$W(x) = \beta H (A/2 - x) \qquad (32)$$

where $\beta$ is the optical absorption coefficient of fused silica (in cm$^{-1}$) and H is the localized transmitted power density in watts per square centimeter. Thus, the axial temperature gradient at the plane defined by x can be written in the form $$\frac{dT}{dx} = \frac{\beta H}{k} \left[ \frac{A}{2} - x \right] \qquad (33)$$

where k is the thermal conductivity of fused quartz (in units of watt cm$^{-1}$ °C.$^{-1}$). By integration of equation (33), we can establish the equilibrium temperature elevation of any internal point with respect to the temperature of the inner surface of the adjacent cooling structure. This gradient induced temperature elevation is given by:

$$\Delta T_g = \frac{\beta H}{2k} [Ax - x^2] \qquad (34)$$

In addition to the temperature elevation due to the internal gradient, there is a thermal step associated with the film of coolant in contact with the cooled surface. This thermal step can be expressed as:

$$\Delta T_f = \frac{\beta H A}{2h} \qquad (35)$$

Where h is the film coefficient, defined by:

$$h = \frac{k}{D} \left[ 3.66 + \frac{0.0668 (D/l) RnPr}{1 + 0.04 ([D/l]RnPr)^{2/3}} \right] \qquad (36)$$

and where D is the hydraulic diameter of the cooling channels, l is the cooling channel length, Rn is the Reynolds number associated with flow in the channels, and Pr is the Prandtl number for the coolant.

Combining equations (34) and (35), expresses the temperature elevation with respect to the coolant at a point located at a distance x from the cooled surface as:

$$\Delta T(x) = \frac{\beta H}{2} \left[ \frac{A}{h} + \frac{Ax - x^2}{k} \right] \qquad (37)$$

The change in refractive index associated with this temperature change is given by:

$$\Delta n(x) = \left[ \frac{\Delta n}{\Delta T} \right] \Delta T(x) \qquad (38)$$

Thus, the increase in optical path length of a thin sheet due to a thermally induced change in index is given by:

$$\Delta n(x)dx = \left[\frac{\Delta n}{\Delta T}\right]\Delta T(x)dx \tag{39}$$

For a localized area of high-power transmission within the window, the axial expansion of the thin sheet at x is approximated closely by:

$$\Delta(dx) = \alpha \Delta T(x)\left[\frac{1+\sigma}{1-\sigma}\right]dx \tag{40}$$

where $\alpha$ is the coefficient of thermal expansion and $\sigma$ is Poisson's ratio. As a consequence of this linear expansion, the optical thickness of the sheet will increase by an amount which can be written as:

$$(n-1)\Delta(dx) = \frac{1+\sigma}{1-\sigma}(n-1)\alpha\Delta T(x)dx \tag{41}$$

where n is the mean refractive index of the substrate.

If we sum equations (39) and (41), substitute for the temperature elevation from equation (37) and integrate over the thickness of the window, we obtain the change in the total optical path length, as follows:

$$\Delta\lambda = \frac{\beta H}{2}\left[\left[\frac{\Delta n}{\Delta T}\right]+\frac{1+\sigma}{1-\sigma}(n-1)\alpha\right]\left[\frac{A^2}{h}+\frac{A^3}{6k}\right] \tag{42}$$

At this point, it is of interest to compare the relative contributions of the terms of equation (42) to the distortion of the transmitted wave.

As previously mentioned, the temperature coefficient of the refractive index for fused silica is $9.7\times10^{-6}$ °C.$^{-1}$. On the other hand, the corresponding term due to linear expansion, $(1+\sigma)(n-1)\alpha/(1-\sigma)$, is only $0.35\times10^{-6}$ °C.$^{-1}$. Thus, for a fused silica window, thermally induced aberrations in the transmitted wavefront are dominated by changes in the refractive index, rather than by linear expansion.

Examination of the right hand bracket in equation (42) allows us to compare the effect of the film coefficient to that of thermal gradients within the bulk of the substrate. In particular, by equating the terms in the bracket and substituting appropriate values previously discussed, one finds that the influences of the film coefficient and substrate conductance are equal for a window thickness of approximately one millimeter. For windows having a thickness significantly greater than this value, the aberration inducing effects are dominated by substrate conductance rather than by the coolant film coefficient.

Thin windows having cooling channels spanning the full width of the window will probably be constrained to a width of approximately five centimeters. Larger windows requiring inlet and exhaust ducts to feed the channels must be significantly thicker than one millimeter, due to practical constraints. Thus for large fused silica windows, we can approximate the optical path length change of equation (42) by the simplified expression:

$$\frac{\Delta\lambda}{H} \approx \frac{(\Delta n/\Delta T)\beta A^3}{12k} \tag{43}$$

$$\approx 6\times10^{-5}\beta A^3$$

Recognizing the strong dependence of optical distortion upon window thickness, it becomes appropriate to return to the more exact relationship of equation (42) so as to examine the power handling capability of a window as a function of its thickness. For this purpose, it is convenient to set $\Delta\lambda$ at $10^{-5}$ cm, i.e. at 1/10 of a wave for a wavelength of one micron. Satisfying this condition, FIG. 8 shows the maximum transmitted power density as a function of window thickness for optical absorption coefficients of $10^{-6}$ cm$^{-1}$ and $10^{-5}$ cm$^{-1}$.

Figure 8:
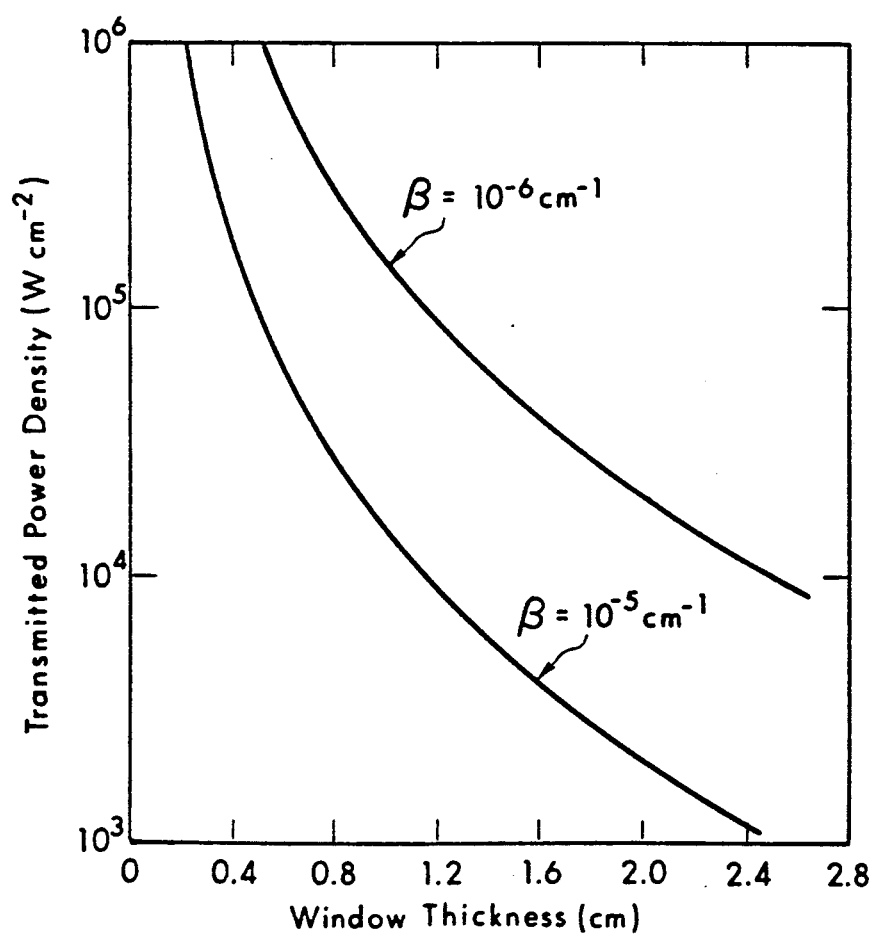
FIG. 8 is a graph showing the power handling capability of cooled fused silica windows.

Assuming the thickness of large windows will be on the order of one centimeter, the plots in FIG. 8 show that such windows will handle power densities in the range of 10 to 100 kilowatts per square centimeter. Specifically, the presently guaranteed value of $\beta<10^{-5}$ cm$^{-1}$ for Corning type 7957 fused silica will assure a power density of 10 kilowatts per square centimeter, while the lower value of $\beta=10^{-6}$ cm$^{-1}$ (which already may have been achieved with the type 7957 material) raises the power density to the 100 kilowatts per square centimeter range.

As previously discussed, the power handling capability of a surface cooling system in fused silica is on the order of 20 watts per square centimeter. However, at transmitted fluxes of 10 and 100 kilowatts per square centimeter, the load upon each cooled surface is only 0.2 and 2.0 watts per square centimeter, respectively. Further, the additional load imposed upon each surface due to the absorption within the substrate is only 0.05 watts per square centimeter, i.e. a negligible contribution to coolant heating. Thus it can be concluded that the optical performance of large fused silica windows, particularly those greater than about five centimeters in width, will be limited almost solely by bulk absorption induced transverse refractive index gradients within the central core of the window. The influences of axial thermal growth and of refractive index gradients within the coolant will be minor.

For windows wherein the optical clear aperture has a width of a few centimeters, the coolant channel length can be made equal to the clear aperture width. For these smaller windows, it becomes feasible to reduce the window thickness to a few millimeters. Under these conditions, the transmitted power density can be increased until optical distortion due to refractive index gradients within the coolant becomes the limiting factor. This higher limit has been shown theoretically to lie in the vicinity of 1,000 kilowatts per square centimeter for a predominantly reflective element having a single cooled surface. To achieve similar optical performance from a cooled transmissive element with two cooled surfaces, the limiting transmitted flux can be expected to be approximately 500 kilowatts per square centimeter. By reference to FIG. 8, it is seen that such a flux can be accommodated by a window having a thickness of approximately 3 millimeters if the absorption coefficient is $10^{-5}$ cm$^{-1}$, and by a thickness of approximately 5.5 millimeters, for an absorption coefficient of $10^{-6}$ cm$^{-1}$.

An optimal design for a thin window employs a coolant flow within the rear surface that is reversed in direction from that of the front surface. For similar absorptions at the front and rear surfaces, the refractive index gradients within the two coolant flows are, to some extent, self-cancelling.

Although of limited size, the power handling capability of these thin windows is quite substantial. For instance, a 2×2 centimeter window, used at normal incidence with a uniform circular beam with a diameter of 2 centimeters, can theoretically accommodate a total power in excess of 1.5 megawatts. Furthermore, it is important to recognize that the width limitation applies only in one dimension. The window can be tilted with respect to the beam to effect a reduction in power density by elongating the footprint of the beam on the window. As an example, if we elongate the footprint of a 2 centimeter diameter beam so as to achieve a footprint which is 20 centimeters long, the total power within the transmitted beam theoretically can be increased to approximately 15 megawatts.

The above disclosure sets forth a number of embodiments of the present invention. Other arrangements or embodiments, not precisely set forth, could be practiced under the teachings of the present invention and as set forth in the following claims.

I claim:

1. An optical element comprising:
   (a) a substantially transparent first plate having at least one optical surface,
   (b) a substantially transparent second plate positioned beneath said first plate, said second plate having cooling channels therein adjacent said first plate, and
   (c) fluid coolant circulating through said cooling channels wherein the refraction index of said coolant substantially matches the refractive index of said second plate for at least one wavelength.

2. The optical element of claim 1 wherein the refractive index of said first plate substantially matches the refractive indices of said coolant and second plate at least at said one wavelength.

3. The optical element of claim 2 wherein said optical surface of said first plate has a coating applied thereto that is at least partially reflective.

4. The optical element of claim 1 further including a substrate positioned beneath said second plate and having inlet and outlet ducts in fluid communication with said cooling channels wherein the refractive index of said substrate substantially matches the refractive indices of said coolant and said second plate at least at said one wavelength.

5. The optical element of claim 4 wherein said optical surface of said first plate has a coating applied thereto that is at least partially reflective.

6. The optical element of claim 5 wherein the refractive index of said first plate substantially matches the refractive indices of said coolant and said second plate at least at said one wavelength.

7. The optical element of claim 4 wherein the refractive index of said first plate substantially matches the refractive index of said coolant and second plate at least at said one wavelength.

8. An optical element comprising:
   (a) a substantially transparent member having at least one optical surface;
   (b) a plurality of cooling channels extending through said member beneath said optical surface;
   (c) a plurality of inlet ducts extending through said member in fluid communication with said cooling channels;
   (d) a plurality of exhaust ducts extending through said member in fluid communication with said cooling channels; and
   (e) a fluid coolant circulating into said inlet ducts, through said cooling channels, and out said exhaust ducts; said fluid coolant having a refractive index substantially matching the refractive index of said member for at least one predetermined wavelength.

9. The optical element of claim 8 further comprising a coating applied to said optical surface that is at least partially reflective.

10. The optical element of claim 8 wherein the depth of said cooling channels is relatively small in comparison to the width of said cooling channels.

11. The optical element of claim 8 wherein the width of said inlet and exhaust ducts is relatively small in comparison to the depth of said inlet and exhaust ducts.

12. The optical element of claim 8 wherein the flow of coolant fluid through said cooling channels is laminar.

13. The optical element of claim 8 wherein said cooling channels extend substantially parallel to one another, and said inlet and outlet ducts extend substantially perpendicular to said cooling channels to form a substantially rectangular grid beneath said optical surface.

14. An optical element comprising:
   (a) a thin, substantially transparent plate containing a plurality of shallow cooling channels extending across said plate;
   (b) a substantially transparent substrate immediately behind said plate;
   (c) a plurality of inlet ducts extending across said substrate immediately behind said plate in fluid communication with said cooling channels;
   (d) a number of exhaust ducts extending across said substrate immediately behind said plate in fluid communication with a number of said cooling channels; and
   (e) a fluid coolant circulating into said inlet ducts, through said cooling channels, and out said exhaust ducts, wherein the refractive index of said coolant fluid substantially matches the refractive indices of said substrate and said transparent plate for at least one predetermined wavelength.

15. The optical element of claim 14 further comprising a face plate immediately above said transparent plate that is at least partially reflective.

16. The optical element of claim 14 wherein the depth of said cooling channels is relatively small in comparison to the width of said cooling channels.

17. The optical element of claim 14 wherein the width of said inlet and exhaust ducts is relatively small in comparison to the depth of said inlet and exhaust ducts.

18. The optical element of claim 14 wherein the flow of coolant fluid through said cooling channels is laminar.

19. The optical element of claim 14 wherein said cooling channels extend substantially parallel to one another, and said inlet and outlet ducts extend substantially perpendicular to said cooling channels to form a substantially rectangular grid beneath said transparent plate.

20. An optical element comprising:
   (a) a thin, substantially transparent face plate having a coating which is at least partially reflective;

(b) a thin, substantially transparent second plate immediately behind said face plate having a surface and a plurality of shallow cooling channels extending substantially in parallel across said surface of said second plate behind said face plate;

(c) a substantially transparent substrate immediately behind said second plate;

(d) a plurality of inlet ducts extending substantially in parallel across said substrate immediately behind said second plate in a direction substantially perpendicular to said cooling channels;

(e) a plurality of exhaust ducts extending substantially in parallel to each other and to said inlet ducts across said substrate immediately behind said second plate in alternating arrangement with said inlet ducts;

(f) a first plurality of holes extending through said second plate, each hole providing a fluid passageway from one of said cooling channels to one of said inlet ducts;

(g) a second plurality of holes extending through said second plate, each hole providing a fluid passageway from one of said cooling channels to one of said exhaust ducts; and (h) a fluid coolant circulating into said inlet ducts, through said cooling channels, and out said exhaust ducts; wherein the refractive index of said coolant fluid substantially matches the refractive indices of said substrate, said face plate, and said second plate for at least one predetermined wavelength.

21. The optical element of claim 20 wherein the width of said inlet and exhaust ducts is relatively small in comparison to the depth of said inlet and exhaust ducts.

22. The optical element of claim 20 wherein the flow of coolant fluid through said cooling channels is laminar.

23. An optical element comprising:

(a) a thin, substantially transparent face plate;

(b) a thin, substantially transparent second plate immediately behind said face plate having a surface and a plurality of shallow cooling channels extending substantially in parallel across the surface of said second plate behind said face plate;

(c) a substantially transparent substrate having two substantially flat surfaces, the first surface of which is immediately behind said second plate;

(d) a plurality of inlet ducts extending substantially in parallel across the first surface of said substrate immediately behind said second plate in a direction substantially perpendicular to the cooling channels on said second plate;

(e) a plurality of exhaust ducts extending substantially in parallel to each other and to said inlet ducts across the first surface of said substrate immediately behind said second plate in alternating arrangement with said inlet ducts;

(f) a first plurality of holes extending through said second plate, each hole providing a fluid passageway from one of said cooling channels to one of said inlet ducts on the first surface of said substrate;

(g) a second plurality of holes extending through said second plate, each hole providing a fluid passageway from one of said cooling channels to one of said exhaust ducts on the first surface of said substrate;

(h) a thin, substantially transparent third plate immediately behind the second surface of said substrate having a plurality of shallow cooling channels extending substantially in parallel across the face of said third plate opposite from said substrate;

(i) a plurality of inlet ducts extending substantially in parallel across the second surface of said substrate immediately in front of said third plate in a direction substantially perpendicular to the cooling channels on said third plate;

(j) a plurality of exhaust ducts extending substantially in parallel to each other and to said inlet ducts across the second surface of said substrate immediately in front of said third plate in alternating arrangement with the inlet ducts on said second surface;

(k) a first plurality of holes extending through said third plate, each hole providing a fluid passageway from one of said cooling channels on said third plate to one of said inlet ducts on the second surface of said substrate;

(l) a second plurality of holes extending through said third plate, each hole providing a fluid passageway from one of said cooling channels on said third plate to one of said exhaust ducts on the second surface of said substrate;

(m) a thin, substantially transparent back plate immediately behind said third plate; and (n) a fluid coolant circulating into said inlet ducts, through said cooling channels, and out of said exhaust ducts.

24. The optical element of claim 23 wherein the refractive index of said coolant fluid substantially matches the refractive indices of said substrate, face plate, second plate, third plate, and back plate for at least one predetermined wavelength.

25. The optical element of claim 23 wherein the width of said inlet and exhaust ducts is relatively small in comparison to the depth of said inlet and exhaust ducts.

26. The optical element of claim 23 wherein the flow of coolant fluid through said cooling channels is laminar.

* * * * *